US010387638B2

(12) United States Patent
Liu et al.

(10) Patent No.: US 10,387,638 B2
(45) Date of Patent: Aug. 20, 2019

(54) PASSWORD HINT GENERATION MECHANISM

(71) Applicant: International Business Machines Corporation, Armonk, NY (US)

(72) Inventors: Guan Jun Liu, Beijing (CN); Niao Qing Liu, Beijing (CN); Ailian Mi, Beijing (CN); Jing Jing Wen, Beijing (CN); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/444,489

(22) Filed: Feb. 28, 2017

(65) Prior Publication Data
US 2018/0247044 A1 Aug. 30, 2018

(51) Int. Cl.
*H04L 9/32* (2006.01)
*G06F 21/00* (2013.01)
*G06F 21/31* (2013.01)
*G06F 21/36* (2013.01)

(52) U.S. Cl.
CPC .............. *G06F 21/36* (2013.01); *G06F 21/31* (2013.01)

(58) Field of Classification Search
CPC ............. G06F 2221/2131; G06F 21/46; H04L 63/083; H04L 9/3226
See application file for complete search history.

(56) References Cited

U.S. PATENT DOCUMENTS

| 9,836,595 | B1* | 12/2017 | Goldberg | G06F 21/46 |
| 2003/0050896 | A1* | 3/2003 | Wiederin | G06Q 20/00 |
| | | | | 705/64 |
| 2009/0313696 | A1* | 12/2009 | Himberger | G06F 21/46 |
| | | | | 726/22 |
| 2010/0005525 | A1 | 1/2010 | Fischer | |
| 2011/0154047 | A1 | 6/2011 | Brown et al. | |
| 2014/0289870 | A1* | 9/2014 | Selander | G06F 21/46 |
| | | | | 726/28 |
| 2017/0353470 | A1* | 12/2017 | Dubost | H04L 63/102 |
| 2018/0197180 | A1* | 7/2018 | Tsai | G06Q 20/4012 |

FOREIGN PATENT DOCUMENTS

CN 103455751 A 12/2013

* cited by examiner

*Primary Examiner* — Alexander Lagor
(74) *Attorney, Agent, or Firm* — Scully, Scott, Murphy & Presser, P.C.; Margaret McNamara, Esq.

(57) ABSTRACT

A system, method, and computer product for managing a password includes receiving a new password set by a user via a key input interface, generating a diagram based on key positions, on the key input interface, of a plurality of characters associated with said new password, storing a diagram into a memory device coupled to the processing device, and providing said diagram stored in the memory device to the user as a password hint.

20 Claims, 6 Drawing Sheets

210

| USER NAME | PASSWORD | PASSWORD HINT DIAGRAM |
|---|---|---|
| TOM | IBMHJK | DIAGRAM OF FIG. 2B |
| ⋮ | ⋮ | ⋮ |

FIG. 3

PASSWORD HINT GENERATION MECHANISM

FIELD

The present disclosure relates to a password management system or method for generating a password hint to a user.

BACKGROUND

Many of serving computing systems (or networks) employ password-base security techniques to prevent unauthorized users from accessing remote resources stored therein or services provided thereby.

Some serving computing systems (or networks) require users to regularly reset passwords for security reasons. In some cases, in case of a user failing to log into the computing systems (or networks) more than a maximum system allowed number, resetting of the password may be requested to the user.

In addition, some serving systems (or networks) do not allow users to use passwords that are easily recalled or guessed based on user's personal information for enhancing security level, thus some people have difficulty in remembering the password. Existing solutions for these problems include: letting a user answer preset security questions and sending an email (or a short message service (SMS)) to his or her own email account (or mobile phone number). However, when answering the preset security questions, the user may even forget right answers or associates who know the user may easily be able to know the answers based on his or her own personal information. Thus, there is a need for a system or method to help a user to recall his or her own password with ease.

SUMMARY

In an aspect of the present disclosure, a system for managing a password is provided. The system includes a processing device and a memory device coupled to the processing device. The processing device is configured to perform receiving a new password set by a user via a key input interface, generating a diagram based on key positions, on the key input interface, of a plurality of characters associated with said new password, storing said diagram into the memory device, and providing said diagram stored in the memory device to the user as a password hint.

In an aspect of the present disclosure, a method, performed by a processing device, for managing a password is provided. The method includes receiving a new password set by a user via a key input interface, generating a diagram based on key positions, on the key input interface, of a plurality of characters associated with said new password, storing a diagram into a memory device coupled to the processing device, and providing said diagram stored in the memory device to the user as a password hint.

In an aspect of the present disclosure, a computer program product comprising a computer readable storage medium having computer readable program instructions embodied therewith is provided. The computer readable program instructions executable by at least one processor to cause a computer to perform a method for managing a password. The method includes receiving a new password set by a user via a key input interface, generating a diagram based on key positions, on the key input interface, of a plurality of characters associated with said new password, storing a diagram into a memory device coupled to the processing device, and providing said diagram stored in the memory device to the user as a password hint.

BRIEF DESCRIPTION OF THE DRAWINGS

FIG. 3 depicts a diagram of an example user password database according to an exemplary embodiment of the present disclosure;

DETAILED DESCRIPTION

Embodiments of the present disclosure will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

According to exemplary embodiments of the present disclosure, a method, system, and computer product for managing a password that allows a user to access a computing system. A system for managing a password according to the present disclosure is also referred to herein as a "password managing system".

Figure 1:
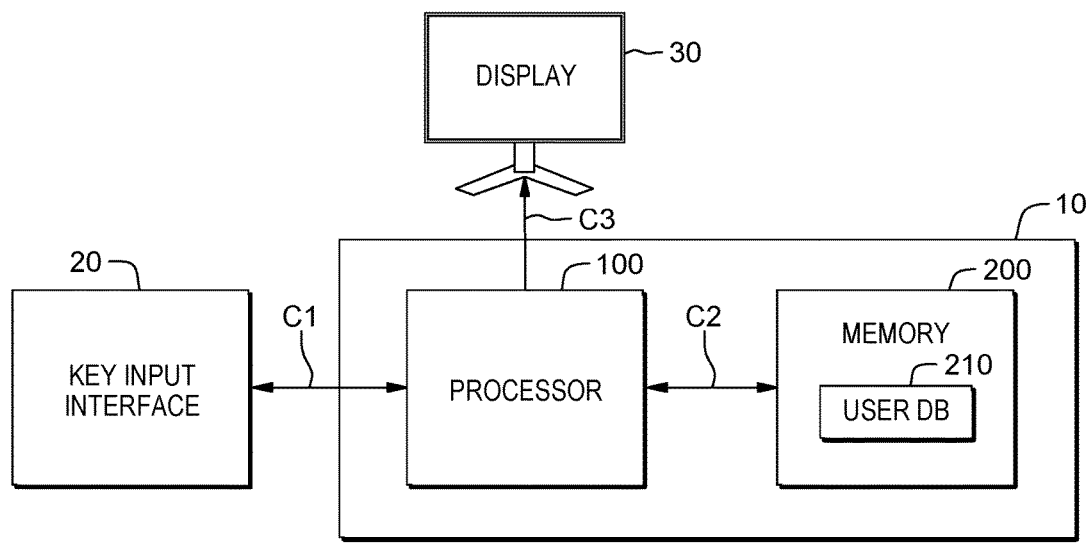
FIG. 1 is a block diagram of an example system environment where a password managing system operates, according to an exemplary embodiment of the present disclosure.

FIG. 1 is a block diagram of an example system environment where a password managing system 10 operates, according to an exemplary embodiment of the present disclosure.

In one aspect, a user (not shown) may be registered as a member to a serving computing system (e.g., a web site, a server, etc.) for accessing information or data stored therein or receiving services provided thereby. When registering, the user may be required to set a new password which will be used to log into the serving computing system.

Referring now to an example depicted in FIG. 1, the user sets a new password and logs into the serving computing system by inputting the password thereto through a key input interface 20 such as a keyboard, a mouse, a touch panel, etc. When setting the password, the key input interface 20 may receive the password from the user and provide the password to the password managing system 10 via a channel C1. The password managing system 10 may be configured to receive the set password and provide a password hint associated with the password to the user when there is a request from the user or the number of user's log-in attempts with incorrect passwords exceeds a maximum allowable number.

In some embodiments, the password managing system 10 includes a processor 100 and a memory 200. The processor 100 may be configured to receive a new password set by the user through the key input interface 20, generate a corresponding diagram based on the new password set by the user, and store the diagram into the memory 200 via a channel C2. If there is a request from the user or the number of user's log-in attempts with incorrect passwords exceeds a maximum allowable number, the processor 100 may retrieve the diagram from the memory 200 and provide the diagram to the user by displaying it on a display screen 30 as a password hint.

Hereinafter, the diagram provided to the user as a password hint is referred to as a "password hint diagram". In some embodiments, the password managing system 10 generates the password hint diagram based on key positions (on the key input interface 20) of a plurality of characters associated with the password. For example, the characters include, but are not limited: letters, numbers, punctuation marks, or the like that represent the password. Since the password hint diagram is associated with the key positions of characters constituting the password, the password hint diagram displayed on the display screen 30 may remind the user of the password that he or she has set.

Figure 2A:
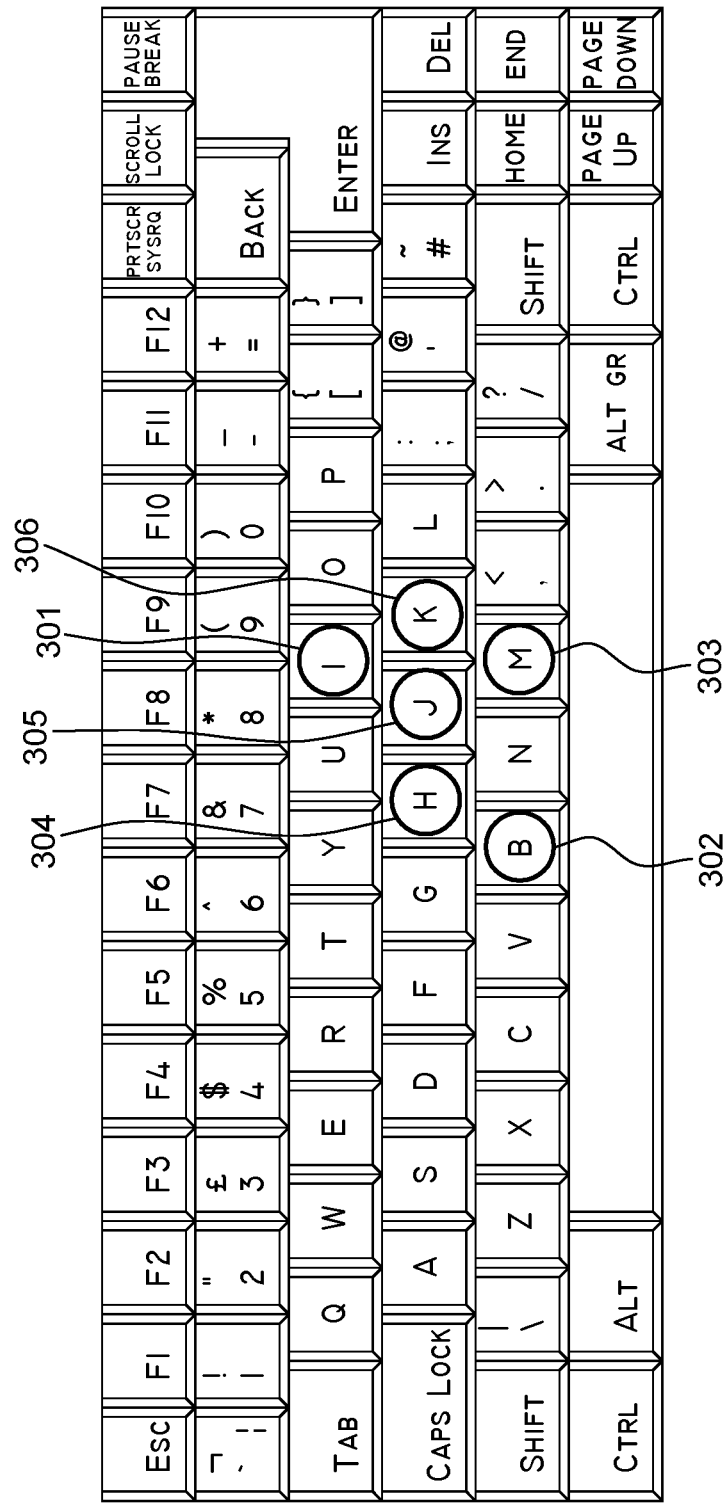
FIG. 2A depicts a diagram of an example key input interface for receiving a user's password input according to an exemplary embodiment of the present disclosure.
Figure 2B:
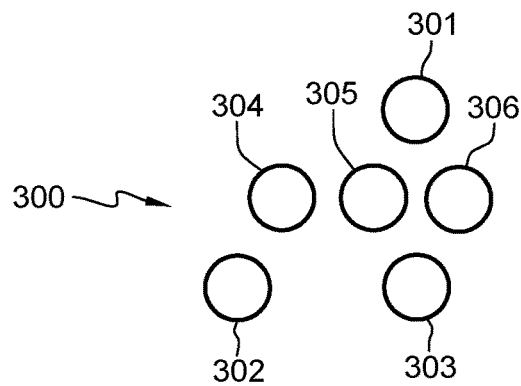
FIGS. 2B and 2C depict examples of password hint diagrams according to an exemplary embodiment of the present disclosure.
Figure 2C:
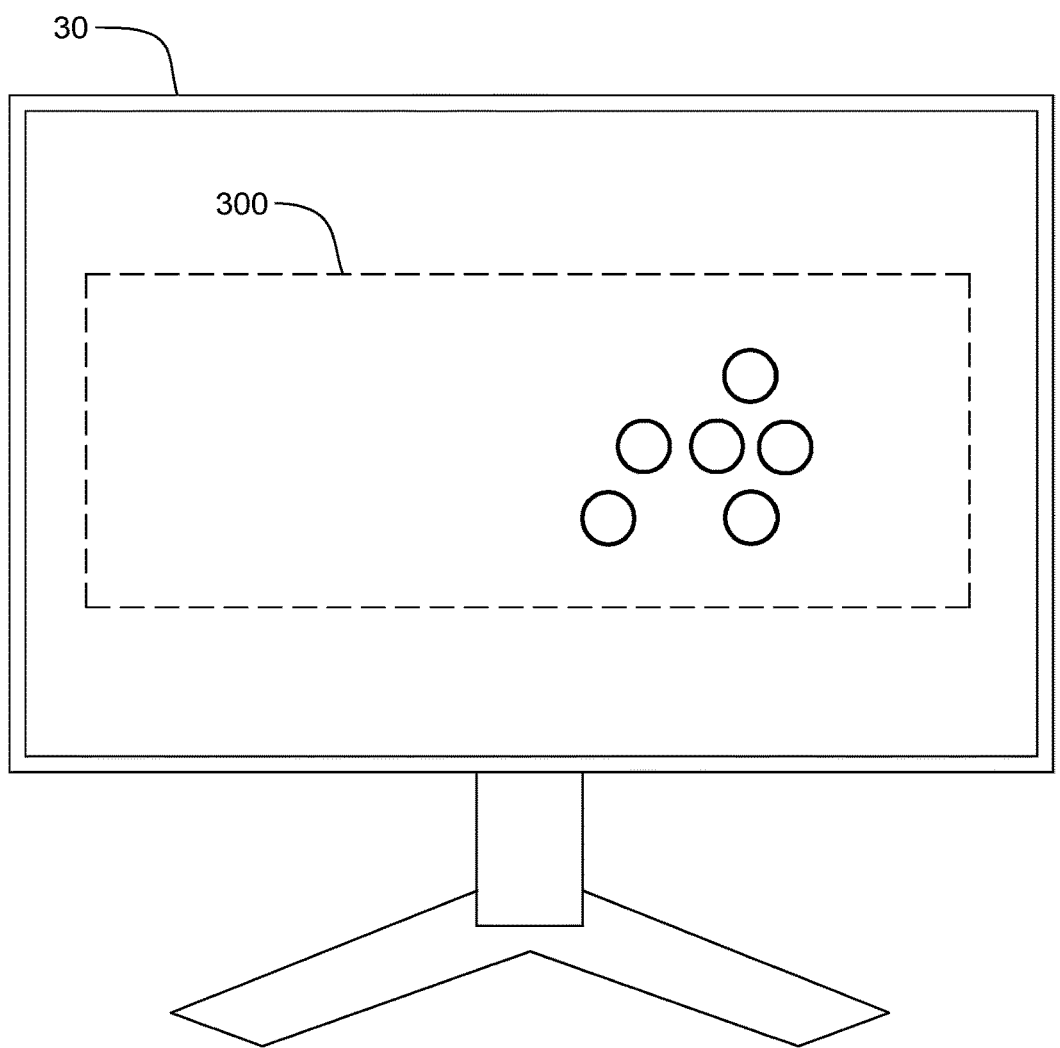

FIG. 2A depicts a diagram of an example key input interface for receiving a user's password input according to an exemplary embodiment of the present disclosure. FIGS. 2B and 2C depict examples of password hint diagrams according to an exemplary embodiment of the present disclosure.

By way of example, referring to FIGS. 2A and 2B, assuming that a user sets a new password with "IBMHJK", key positions of characters associated with the password may correspond to what are shown with reference numbers 301 to 306 of FIG. 2A. Thus, the password hint diagram generated by the processor 100 in response to a receipt of the password "IBMHJK" may be given as an example 300 in FIG. 2B and stored in the memory 200 by a binary data format. Next, if there is a request from the user or the number of user's log-in attempts with incorrect passwords exceeds a maximum allowable number, the diagram 300 may be displayed on the display screen 30, as depicted in FIG. 2C.

As shown in FIG. 2C, the password hint diagram 300 is straightforward for the user to recall. Also, since the password hint diagram 300 has no information associated with any specific characters and there exist a huge number of key input combinations to match the password hint diagram 300 if considering sequences of the key inputs, it is even harder for unauthorized users to come up with a desired password from the diagram 300. In some aspects, the password hint diagram 300 is stored as binary data which is inherently more secure than stored as text data. Thus, the above-described features of the password hint diagram 300 allows more enhanced security for the password.

A "new password" may be set by a user due to various scenarios such as: when the user is first registered to the serving computer system; when the user or the serving system wants to change the password for security reasons, or the like. For example, referring back to FIG. 1, the processor 100 receives a new password set by the user through the key input interface 20 when the user is registered to the password managing system 10. Next, the processor 100 generates a corresponding diagram based on key positions (on the key input interface 20) of characters constituting the new password and stores the diagram into the memory 200.

In addition, the processor 100 provides the diagram corresponding to the set new password to the user as a password hint if there is a request from the user or the number of user's log-in attempts with incorrect passwords exceeds a maximum allowable number. Next, the processor 100 receives other new password which has been reset or changed by the user. Then, the processor 100 may update a password for the user and a corresponding diagram to ones corresponding to said other new password which has been reset or changed by the user. The processor 100 provides the updated diagram corresponding to the reset new password to the user as a new password hint.

In some embodiments, the key input interface 20, the display screen 30, the processor 100, and the memory 200 are locally connected to one to another through the channels C1 to C3. In this embodiment, the key input interface 20, the display screen 30, the processor 100, and the memory 20 are implemented in a single stand-alone device such as an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like, so that no network interfaces or connection is necessary among the key input interface 20, the display screen 30, the processor 100, and the memory 200.

In other embodiment, at least one of the key input interface 20, the display screen 30, the processor 100, and the memory 200 may be remotely connected to at least another one thereof. For example, the processor 100 and the memory 200 are implemented at remote locations. In such example, the channel C2 may be a wired or wireless communication channel. Thus, the processor 100 may communicate with the memory 200 using network adapters which support wired communications based on Internet, LAN, WAN, or the like, or wireless communications based on CDMA, GSM, wideband CDMA, CDMA-2000, TDMA, LTE, wireless LAN, Bluetooth, or the like.

In some embodiments, the password managing system 10 may manage one or more users. Thus, in this case, the memory 200 may store one or more user passwords into a database 210, as shown in FIG. 1.

FIG. 3 depicts a diagram of an example user password database 210 according to an exemplary embodiment of the present disclosure. As exemplarily seen in FIG. 3, the database 210 includes a user name, a password set by the user, and a password hint diagram corresponding to the password.

Figure 4A:
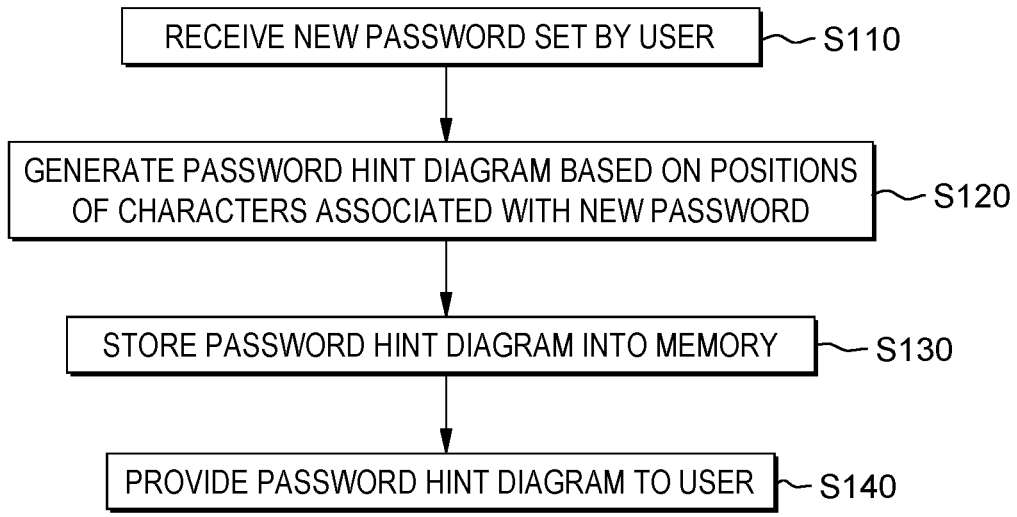
FIGS. 4A and 4B depict flow charts of a method for managing a password according to an exemplary embodiment of the present disclosure.
Figure 4B:
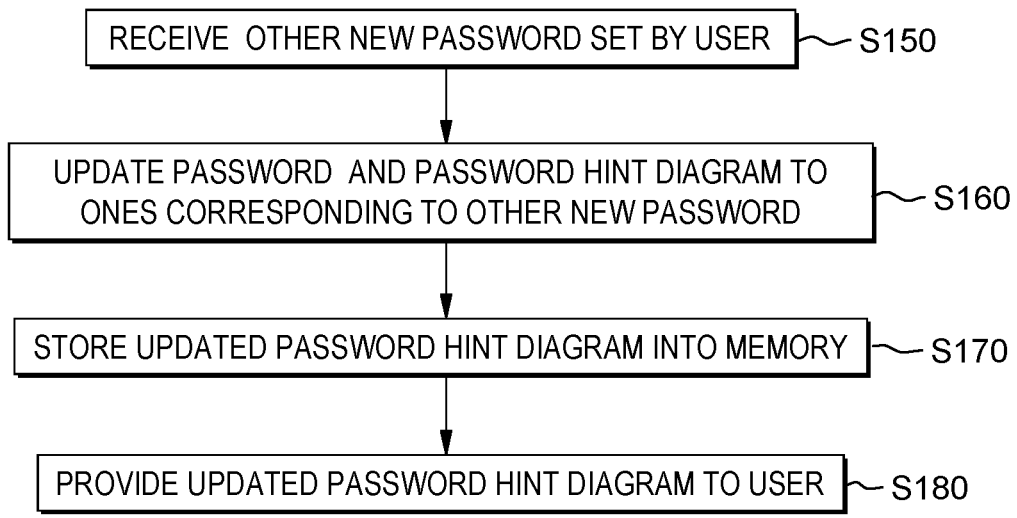

FIGS. 4A and 4B depict flow charts of a method for managing a password according to an exemplary embodiment of the present disclosure. Referring now to FIG. 4A, at step S110, the processor 100 (FIG. 1) receives a new password set by a user and generate a password hint diagram based on key positions (on a key input interface 20 of FIG. 1) of a plurality of characters constituting the new password (S120). Next, the processor 100 stores the generated password hint diagram into a memory 200 (FIG. 1) (S130). If there is a request from the user or the number of user's log-in attempts with incorrect passwords exceeds a maximum allowable number, the processor 100 retrieves the password hint diagram from the memory 200 and provides the retrieved password hint diagram to the user (S140).

In addition, referring now to FIG. 4B, if the processor 100 receives other new password reset by the user (S150), the processor 100 updates a password for the user and a corresponding password hint diagram to ones corresponding to said other new password which has been reset by the user (S160). Next, the processor 100 stores the updated password hint diagram into the memory 200 (S170) and provides the updated password hint diagram to the user if there is a request from the user or the number of user's log-in attempts with incorrect passwords exceeds a maximum allowable number (S180).

Figure 5:
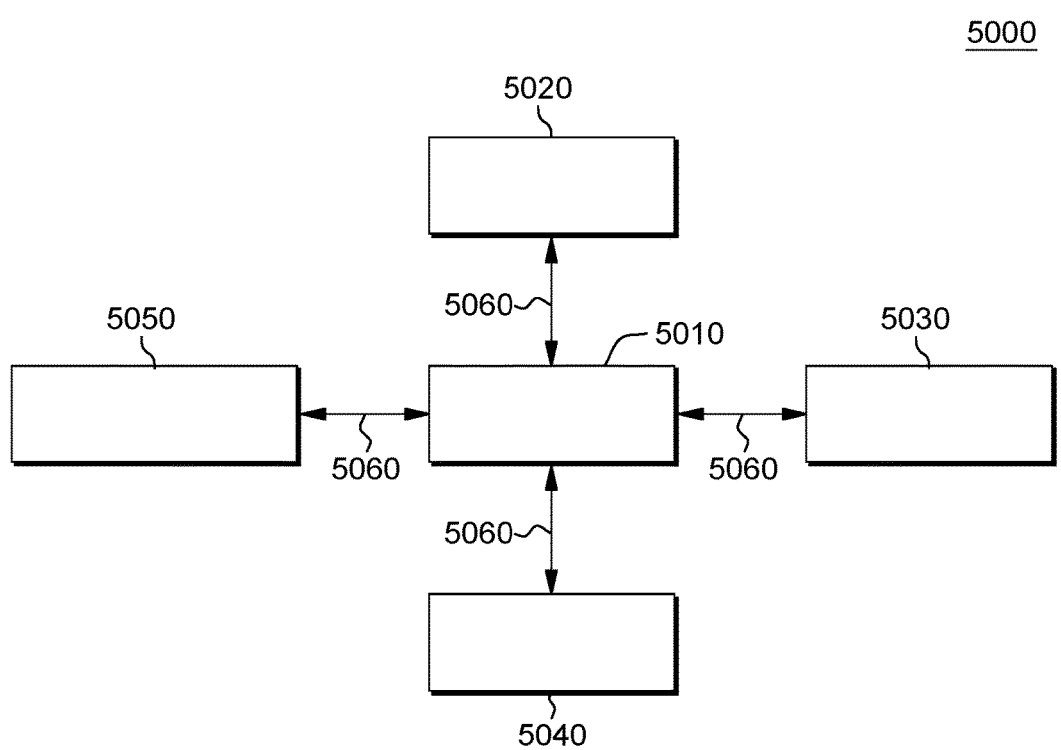
FIG. 5 is a block diagram of a computing system according to an exemplary embodiment of the present disclosure.

FIG. 5 is a block diagram of a computing system 5000 according to an exemplary embodiment of the present disclosure.

Referring to an example depicted in FIG. 5, the computing system 5000 may be used (without limitation) as a platform for performing (or controlling) the functions or operations described hereinabove with respect to the password managing system 10 of FIG. 1, and/or methods of FIGS. 4A and 4B.

In addition (without limitation), the computing system 5000 may be implemented with an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 5, the computing system 5000 may include a processor 5010, I/O devices 5020, a memory system 5030, a display device 5040, bus 5060, and a network adaptor 5050.

The processor 5010 is operably coupled to and may communicate with and/or drive the I/O devices 5020, memory system 5030, display device 5040, and network adaptor 5050 through the bus 5060.

The computing system 5000 can communicate with one or more external devices using network adapter 5050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 5000 may also include or access a variety of computing system readable media. Such media may be any available media that is accessible (locally or remotely) by a computing system (e.g., the computing system 5000), and it may include both volatile and non-volatile media, removable and non-removable media.

The memory system 5030 can include computer system readable media in the form of volatile memory, such as random access memory (RAM) and/or cache memory or others. The computing system 5000 may further include other removable/non-removable, volatile/non-volatile computer system storage media.

The memory system 5030 may include a program module (not shown) for performing (or controlling) the functions or operations described hereinabove with respect to the password managing system 10 of FIG. 1, and/or methods of FIGS. 4A and 4B according to exemplary embodiments. For example, the program module may include routines, programs, objects, components, logic, data structures, or the like, for performing particular tasks or implement particular abstract data types. The processor (e.g., 5010) of the computing system 5000 may execute instructions written in the program module to perform (or control) the functions or operations described hereinabove with respect to the password managing system 10 of FIG. 1, and/or methods of FIGS. 4A and 4B. The program module may be programmed into the integrated circuits of the processor (e.g., 5010). In some embodiments, the program module may be distributed among memory system 5030 and one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A system for managing a password, comprising:
a processing device; and
a memory device coupled to the processing device,
wherein the processing device is configured to perform:
   receiving a new password set by a user via a key input interface;
   generating a single diagram based on key positions, on the key input interface, of a plurality of characters associated with said new password;
   storing said single diagram into the memory device; and
   providing said single diagram stored in the memory device to the user as a password hint.

2. The system of claim 1, wherein the processing device is configured to perform providing said single diagram, responsive to a request by the user.

3. The system of claim 1, wherein the processing device is configured to perform providing said single diagram, responsive to the user entering passwords incorrectly more than a predetermined number of times.

4. The system of claim 1, wherein the key input interface is implemented using a keyboard or a touch pad.

5. The system of claim 1, wherein to perform providing said single diagram, the processing device is configured to perform displaying said single diagram using a display device.

6. The system of claim 1, wherein responsive to other new password being set by the user, the processing device is configured to further perform:
   generating other diagram based on key positions, on the key input interface, of a plurality of characters associated with said other new password;
   storing said other diagram into the memory device; and
   providing said other diagram to the user as other password hint.

7. The system of claim 6, wherein said other new password comprises a password reset by the user.

8. The system of claim 1, wherein the memory device is locally connected to the processing device.

9. The system of claim 1, wherein the memory device is remotely connected to the processing device through a wired or wireless communication channel.

10. A method, performed by a processing device, for managing a password, the method comprising:
    receiving a new password set by a user via a key input interface of the processing device;
    generating, at the processing device, a single diagram based on key positions, on the key input interface, of a plurality of characters associated with said new password;
    storing the single diagram into a memory device coupled to the processing device; and
    providing said single diagram stored in the memory device to the user as a password hint via an interface display at the processing device.

11. The method of claim 10, wherein said single diagram is provided responsive to a request by the user.

12. The method of claim 10, wherein said single diagram is provided responsive to the user entering passwords incorrectly more than a predetermined number of times.

13. The method of claim 10, wherein responsive to other new password being set by the user, the method further comprises:
    generating other diagram based on key positions, on the key input interface, of a plurality of characters associated with said other new password;
    storing said other diagram into the memory device; and
    providing said other diagram to the user as other password hint.

14. The method of claim 10, wherein said single diagram is provided by displaying said single diagram on a display screen.

15. The method of claim 10, wherein the memory device is locally connected to the processing device.

16. A computer program product comprising a computer-readable storage medium having computer readable program instructions embodied therewith, the computer readable program instructions executable by at least one processor to cause a computer to perform a method comprising:
    receiving a new password set by a user via a key input interface;
    generating a single diagram based on key positions, on the key input interface, of a plurality of characters associated with said new password;
    storing said single diagram into a memory device coupled to the processing device; and
    providing said single diagram stored in the memory device to the user as a password hint.

17. The computer program product of claim 16, wherein said single diagram is provided responsive to a request by the user.

18. The computer program product of claim 16, wherein said single diagram is provided responsive to the user entering passwords incorrectly more than a predetermined number of times.

19. The computer program product of claim 16, wherein responsive to other new password being set by the user, the method further comprises:
    generating other diagram based on key positions, on the key input interface, of a plurality of characters associated with said other new password;
    storing said other diagram into the memory device; and
    providing said other diagram to the user as other password hint.

20. The computer program product of claim 16, wherein said single diagram is provided by displaying said single diagram on a display screen.

* * * * *